US012586369B1

(12) United States Patent
Jagadeesan et al.

(10) Patent No.: US 12,586,369 B1
(45) Date of Patent: Mar. 24, 2026

(54) FAST, FULLY AUTOMATIC, DATA-CENTRIC OUT-OF-THE-BOX AI MODEL BUILDING

(71) Applicant: LandingAI Inc., Palo Alto, CA (US)

(72) Inventors: Shankaranand Jagadeesan, San Jose, CA (US); Dillon Laird, Santa Monica, CA (US); Yu Qing Zhou, Stanford, CA (US); Yuxiang Zhang, Shanghai (CN); Daniel Bibireata, Bellevue, WA (US); Kai Yang, Fremont, CA (US); Mark William Sabini, River Edge, NJ (US); Abdelhamid Bouzid, Louisville, KY (US); Andrew Yan-Tak Ng, Camas, WA (US)

(73) Assignee: LandingAI Inc., Palo Alto, CA (US)

( * ) Notice: Subject to any disclaimer, the term of this patent is extended or adjusted under 35 U.S.C. 154(b) by 293 days.

(21) Appl. No.: 18/229,724

(22) Filed: Aug. 3, 2023

Related U.S. Application Data

(60) Provisional application No. 63/394,914, filed on Aug. 3, 2022.

(51) Int. Cl.
| | |
|---|---|
| *G06V 10/82* | (2022.01) |
| *G06V 10/70* | (2022.01) |
| *G06V 10/74* | (2022.01) |

(52) U.S. Cl.
CPC ............ *G06V 10/87* (2022.01); *G06V 10/761* (2022.01); *G06V 10/82* (2022.01)

(58) Field of Classification Search
CPC ....... G06V 10/87; G06V 10/761; G06V 10/82
See application file for complete search history.

(56) References Cited

U.S. PATENT DOCUMENTS 11,182,646 B2    11/2021   Wang et al.

FOREIGN PATENT DOCUMENTS

CN          110210286 A   *   9/2019   .......... G06T 7/0012

\* cited by examiner

*Primary Examiner* — David F Dunphy
(74) *Attorney, Agent, or Firm* — Fenwick & West LLP

(57) ABSTRACT

A system or a method for fast training an artificial intelligence (AI) model. The system accesses a training dataset, divides the training dataset into a training subset and a holdout test subset, and trains the AI model using the training subset. For each of multiple training epochs, the system checkpoints while training the AI model. Checkpointing includes applying the trained AI model to the training subset to determine a train loss value, applying the trained AI model to the holdout test subset to determine a test loss value, and determining whether both train loss values and test loss values converge at a particular epoch. Responsive to determining that convergence occurred at the particular epoch, the system selects the AI model trained at the particular epoch.

18 Claims, 8 Drawing Sheets

Training Dataset
180

182

184

Fast Training System
100

Training Dataset Analysis Module
110

Model Selection Module
120

Training Module
130

Checkpointing Module
140

AI Model
190

FAST, FULLY AUTOMATIC, DATA-CENTRIC OUT-OF-THE-BOX AI MODEL BUILDING

CROSS-REFERENCE TO RELATED APPLICATION

This application claims the benefit of a U.S. Provisional Application No. 63/394,914, titled "Fast Out of the Box Training," filed Aug. 3, 2022, which is incorporated herein by reference in its entirety.

BACKGROUND

1. Technical Field

This disclosure relates generally to artificial intelligence (AI) model building, and more particularly to fast, fully automatic, data-centric, out-of-box AI model building.

2. Description of Related Art

Computer vision is a field of artificial intelligence (AI) that enables machines, such as computers or robots, to interpret and understand visual information from the world around them. A primary goal of computer vision is to replicate human vision and perception, allowing machines to extract meaningful insights from images, videos, and other visual data. Computer vision can be used to perform tasks like image recognition, object detection, and image segmentation. Image recognition includes identifying and classifying objects or patterns within images. Object detection includes locating and identifying specific objects within an image or video stream. Image segmentation includes dividing an image into distinct regions to facilitate a more detailed analysis.

In the realm of computer vision solutions, the conventional approach involves image collection and ground truth data annotation, which provides an algorithm or model insight into the problem. Subsequently, an AI model is trained using compute devices like GPUs or TPUs. Once completed, the trained AI model is deployed on edge devices for inference. However, this entire process is time-consuming, even when employing low-code or no-code platforms, and accelerating time to value is difficult for AI model building. Among the bottlenecks in this process, both in terms of time and performance, lies the iterative nature of deep learning model training.

In particular, the significance of selecting hyperparameters cannot be overstated when aiming to efficiently and precisely train an AI model. For example, one of the hyperparameters is a number of training epochs. A number of training epochs directly impacts how long an AI model will be trained on the data. If the AI model is trained for too few training epochs, it might not have sufficient time to learn the underlying patterns in the data, leading to underfitting. On the other hand, if the model is trained for too many epochs, it might start memorizing the training data instead of generalizing it to unseen data, leading to overfitting. The appropriate number of epochs depends on the size and complexity of the dataset. Further, different AI model architectures have different learning rates, and some AI models may converge faster than others. The optimal number of epochs might vary based on the architecture being used.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

SUMMARY

Figure 1:
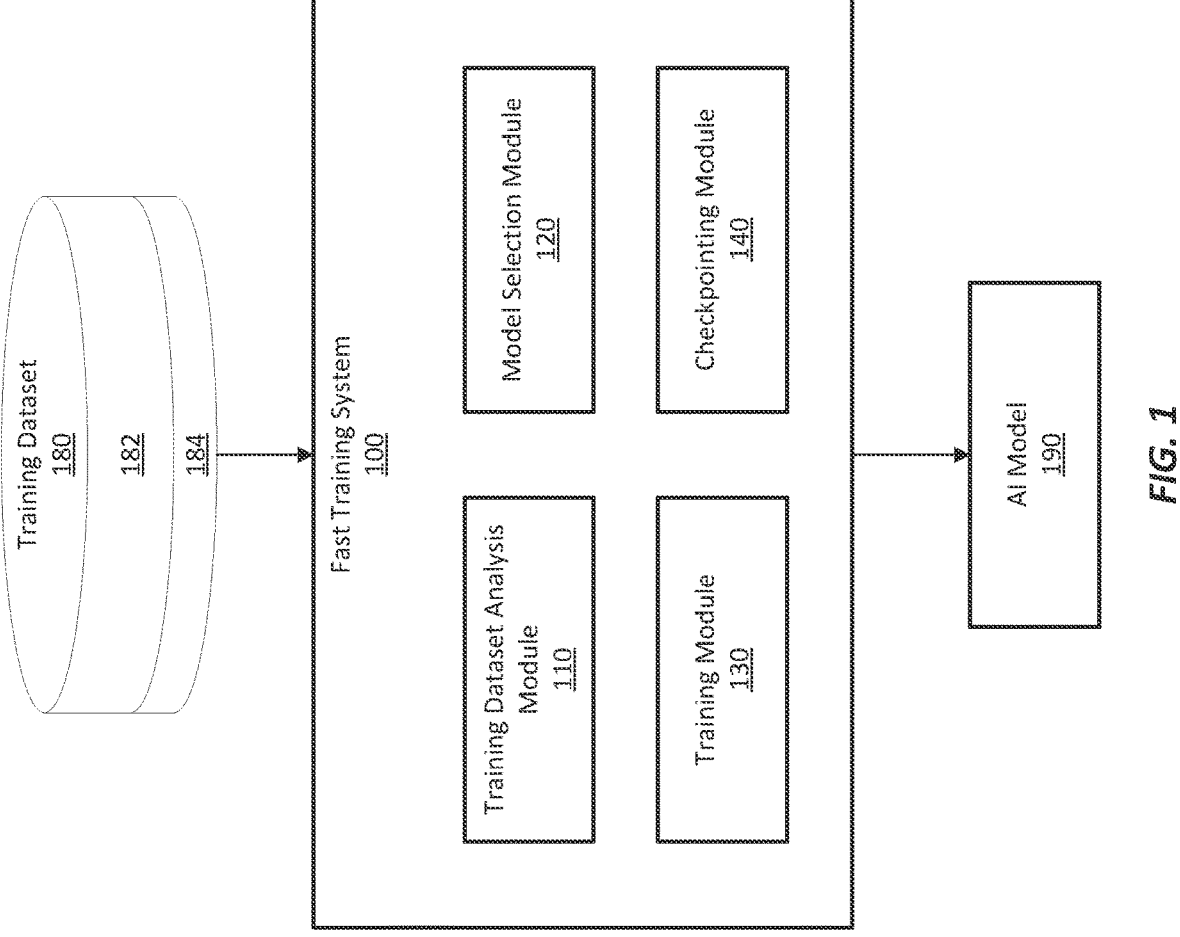
FIG. 1 illustrates an example fast training system in accordance with some embodiments.

Embodiments described herein include a method or a system to streamline the training process of an artificial intelligence (AI) model. These embodiments include automated selection or adjustment of one or more hyperparameters, such as (but not limited to) the number of training epochs. This approach ensures the AI model is trained efficiently, striking a balance to prevent both underfitting and overfitting.

The system accesses a training dataset. The training dataset includes a plurality of labeled samples, each of which is labeled with a ground-truth label. The system divides the plurality of labeled samples into a training subset and a holdout test subset, and trains the AI model using the training subset. For each of a plurality of training epochs, the system checkpoints while training the AI model. Checkpointing includes applying the trained AI model to the training subset to determine a train loss value, applying the trained AI model to the holdout test subset to determine a test loss value, and determining whether both the training loss and test loss converge at the same epoch. Converging of train loss values or test loss values occurs when global minima of the respective train loss values or test loss values is present at an epoch. In response to determining that convergence occurred at a particular epoch, the system selects an AI model trained at the particular epoch.

On the other hand, in response to determining that convergence did not occur at a same epoch, the system identifies an epoch with a lowest test loss value, and determines whether a difference between the train loss value and the test loss value at the epoch is within a margin. Responsive to determining that the difference between the train loss value and test loss value at the epoch is within the margin, the system selects an AI model trained at that epoch.

In some embodiments, in response to determining that the difference between the train loss value and test loss value at the epoch is not within the margin, the training system automatically extends the training process for m epochs to find a converging epoch, or to find an epoch corresponding to a lowest test loss value, where the training test loss value is within a margin of the test loss value. If the training loss and test loss converge during the extra m epochs, the model at the converging epoch is selected. This process may repeat as many times as necessary until a converging epoch is found. Alternatively, the process may stop at a maximum epoch. In some embodiments, the converging process also allows the test loss value to be within a certain margin of the lowest test loss value instead of being the absolute minimum.

In some embodiments, the system also analyzes images in the training dataset to determine characteristics of the images, and selects a machine-learning algorithm and a set of hyperparameters for training the AI model based in part on the characteristics of the images. The characteristics of the images include a characteristic indicative of a domain among a plurality of domains to which the plurality of images belong. In some embodiments, the plurality of domains include an industrial domain, a medical domain, an agriculture domain, and a transportation domain.

In some embodiments, the system also benchmarks a set of AI models against a plurality of training datasets (also referred to as benchmark training datasets), compares the characteristics of the training dataset with characteristics of the plurality of benchmark training datasets to determine similarity. Benchmarking the set of pretrained AI models against the plurality of benchmark training datasets includes logging a plurality of metrics of the set of AI models used to train the plurality of benchmark training datasets. The system compares the characteristics of the training dataset with characteristics of the plurality of benchmark training datasets to determine similarity, and select an AI model from the set based in part on the similarity and the plurality of metrics of the set of AI models.

In some embodiments, selecting the AI model in the set includes (but is not limited to) selecting a backbone network of the AI model. In some embodiments, selecting the AI model in the set further includes freezing a portion of the backbone network of the selected AI model.

DETAILED DESCRIPTION

Computer vision is a field of artificial intelligence (AI) that enables machines, such as computers or robots, to interpret and understand visual information from the world around them. A primary goal of computer vision is to replicate human vision and perception, allowing machines to extract meaningful insights from images, videos, and other visual data. Computer vision can be used to perform tasks like image recognition, object detection, and image segmentation. Object detection includes locating and identifying specific objects within an image or video stream, e.g., a defect vs. not a defect. Image recognition includes identifying and classifying objects or patterns within images, e.g., different types of defects. Image segmentation includes dividing an image into distinct regions to facilitate a more detailed analysis, e.g., each pixel in an image is classified into categories on the basis of instances to detect boundaries.

Supervised training uses labeled datasets as ground truth to train an AI model. Different machine learning techniques allow computers to observe labeled datasets and develop models to accomplish different tasks, such as classification tasks, segmentation tasks, and/or object detection tasks. However, this entire training process is time-consuming, even when employing low-code or no-code platforms, and accelerating time to value is difficult for AI model building. Among the bottlenecks in this process, both in terms of time and performance, lies the iterative nature of deep learning model training.

For example, a number of training epochs directly impacts how long an AI model will be trained on the data. If the AI model is trained for too few training epochs, it might not have sufficient time to learn the underlying patterns in the data, leading to underfitting. On the other hand, if the model is trained for too many epochs, it might start memorizing the training data instead of generalizing it to unseen data, leading to overfitting. The appropriate number of epochs depends on the size and complexity of the dataset. Further, different AI model architectures have different learning rates, and some AI models may converge faster than others. The optimal number of epochs might vary based on the architecture being used.

Embodiments described herein include innovative techniques that enable rapid and performance-oriented out-of-the-box training. In some embodiments, the techniques can take less than 90 seconds to highlight the limits of the data or provide modeling choices, and provide a low code or no-code approach to solve computer vision problems.

The embodiments described herein may be used to train AI models in a variety of domains. For example, in food manufacturing, food inspection is a crucial process that ensures the safety and quality of the food product. An AI model may be trained to detect anomalies or foreign objects in the food product. However, since anomalies and foreign objects are very rare, positive training samples are scarce, e.g., only 20 positive samples and 200 negative samples. In such a case, it is unproductive to train a model for hours. Embodiments described herein can build an AI model in 5 minutes, and checkpoint the AI model to determine how effective the model is. In some embodiments, a model can be deployed onto an inspection camera within a few minutes. Further, an AI model built for products produced by a first food line may be used to inspect products produced by a second food line. Further, for a user with very little machine learning knowledge or experience, the embodiments described herein provide a low-code or no-code system that automatically selects AI algorithms (e.g., neural network, backbone network, etc.) and hyperparameters (e.g., number of training epochs, batch size, etc.) for the user, and builds an AI model based on the training dataset within several minutes.

FIG. 1 illustrates an example fast training system 100 in accordance with some embodiments. The fast training system 100 receives training dataset 180 as input to output an AI model 190. In some embodiments, the fast training system 100 includes a domain selection module 110, a model selection module 120, a training module 130, and a checkpointing module 140. Alternative embodiments may include more, fewer, or different components from those illustrated in FIG. 1, and the functionality of each component may be divided between the components differently from the description below. Additionally, each component may perform its respective functionalities in response to a request from a human or automatically without human intervention.

The training dataset 180 includes a plurality of labeled samples. Each of the plurality of labeled samples is labeled with a ground-truth label. In some embodiments, each sample includes an image. In a classification task, each sample image is labeled as an object or not an object (e.g., a defect or not a defect). In an object recognition task, each sample image is labeled as one of multiple classes of objects (e.g., different types of defects). In a segmentation task, each pixel in each sample image is labeled into categories, which can then be used to detect boundaries. The training dataset 180 is divided into a training subset 182 and a holdout test subset 184. The training subset 182 is used to train an AI model, and the holdout test subset 184 is used to test the performance of the trained AI model.

The training dataset analysis module 110 is configured to analyze the training dataset 180 to determine characteristics of the training dataset 180. In some embodiments, the characteristics include a domain among a plurality of domains to which the training dataset belongs. The plurality of domains may include (but are not limited to) an industrial domain, a transportation domain, a medical domain, an agricultural domain, a marine domain, etc. These domains may further include subdomains. For example, the industrial domain may include images related to manufacturing processes. For example, in the food manufacturing industry, such images may be obtained from a food packaging process and used to train a model for detecting foreign objects in food packaging. The transportation domain may include transportation images. Such images may be obtained from traffic drones that fly over surface roads, highways, sidewalks, etc., and used to train a model for predicting travel time. The medical domain may include medical images. Such images may be obtained from medical imaging devices, such as radiography, magnetic resonance imaging (MRI), nuclear medicine, ultrasound, etc., and used for identifying tumors or abnormalities. The agricultural domain may include images related to agricultural processes, such as planting or harvesting process. The marine domain may include images related to underwater objects. Such images may be obtained from underwater vehicles and used for identifying marine creatures and animals.

In some embodiments, the characteristics of the training dataset also include a size of image, a color channel of image, an annotation size to image size ratio, an amount of ground truth data, or a degree of human-level performance. Human-level performance refers to the level of performance achieved by an AI model that is comparable to that of a human expert on a particular task. In other words, when an AI model reaches human-level performance, it can perform the task with similar accuracy, precision, and recall as a human with expertise in that domain. However, human-level performance is not a fixed target, and it can vary depending on the complexity of the task and the specific domain. Some AI models may surpass human-level performance on certain tasks, while on others, they may still fall short.

The model selection module 120 is configured to select an AI algorithm and a set of hyperparameters for training the AI model based in part on the characteristics of the training dataset. The training module 130 is configured to train the AI model based on the selected AI algorithm and the set of hyperparameters.

The checkpointing module 140 is configured to checkpoint the AI model during training to determine whether the trained AI model is sufficiently accurate for the task at hand or whether the AI model starts to overfit the training subset. In some embodiments, the checkpointing module 140 applies the trained AI model to the training subset to determine a train loss value, and applies the trained AI model to the holdout test subset to determine a test loss value. The checkpointing module 140 records the train loss value and the test loss value for each checkpointed epoch. Since the AI model is trained based on the training subset, the more training epochs the AI model is trained, the lower the train loss value will be. However, this is not necessarily true of the test loss value. For example, when the quality of training data or the volume of the training data is limited, the train loss value and the test loss value may first converge during the first several training epochs, and then start to diverge after that. The diverging point is where the model starts to overfit the training subset, but no longer fits the holdout test set. When this occurs, additional training generally will no longer improve the model.

Alternatively, when the quality of training data and/or the volume of the training data are high, the train loss value and the test loss value may continue to converge for many training epochs. When the test loss value reaches a fairly low threshold (e.g., 1%), there is also very limited gain to continue to train the AI model.

Note, there may also be a case where the quality of the training data and/or the volume of the training data are low, the train loss value and the test loss value start to diverge at an early training epoch; and/or the test loss value is never lower than an acceptable threshold. The checkpointing module 140 determines whether a number of training epochs at which the train loss value and the test loss value diverge is below a threshold, or whether the test loss value is below a threshold. Responsive to such a determination, the checkpointing module 140 may conclude that the quality of the training data is too poor, or the volume of the training samples is too low. When this occurs, the system 100 may generate an alert, notifying a user that the training data is limited, and additional or better training data should be obtained for better results.

Figure 2:
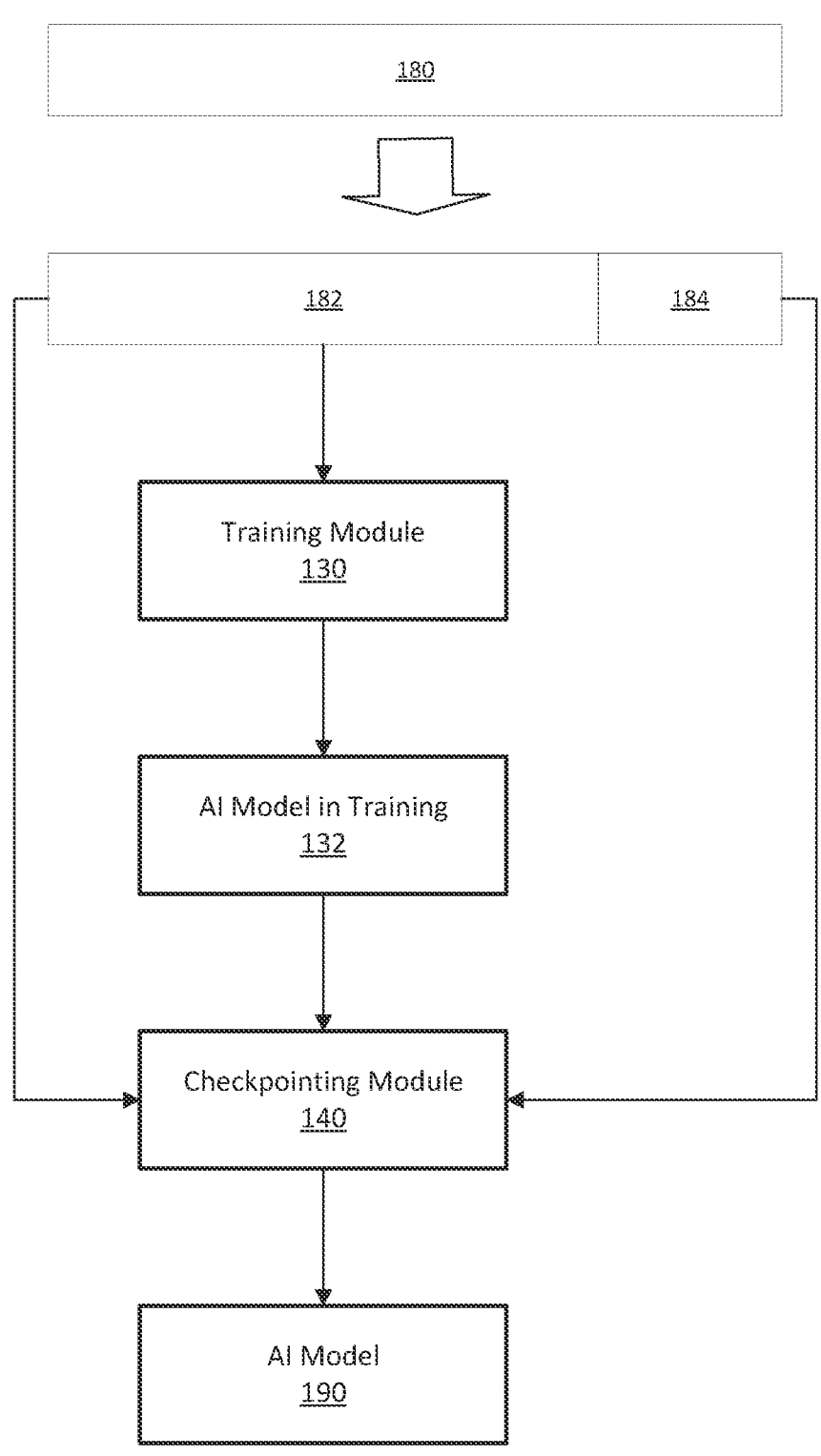
FIG. 2 illustrates an example process of training an artificial intelligence (AI) model in accordance with some embodiments.

FIG. 2 illustrates an example process of training the AI model 190. The training dataset 180 is divided into a training subset 182 and a holdout test subset 184. In some embodiments, the division is based on a predetermined ratio, e.g., 3:1 or 70%: 30%. In some embodiments, a user can set the ratio between the training subset 182 and the holdout test subset 184 based on their preference. The training module 130 uses the training subset 182 to train the AI model 190. As briefly discussed above, training an AI model is an iterative process. A training epoch is one complete iteration during the training. During a training epoch, the AI model 132 in training is presented with the entire training subset, and the AI model's weights and biases are updated to reduce error in the training subset. The number of training epochs is an important hyperparameter for the AI algorithm and specifies the number of complete iterations of the entire training subset through the training.

The checkpointing module 140 can perform checkpointing at any training epoch. Checkpointing is a technique used to save the current state of the AI model 132 and analyze the performance of the AI model 132. If the performance of the AI model 132 is sufficiently good, the system 100 can stop training and output the AI model 132 in training as the trained AI model 190 to the user. If the performance of the AI model 132 is not sufficiently good, the system 100 can continue the training.

In some embodiments, checkpointing includes applying the AI model 132 in training to the training subset 182 to determine a train loss value, applying the AI model 132 in training to the holdout subset 184 to determine a test loss value, and determining whether both the train loss value and test loss value converge at a same epoch. In some embodiments, for each of a plurality of training epochs, the checkpointing module 140 performs checkpointing and tracks train loss values and test loss values. The system 100 determines whether both the train loss value and the test loss value converge at a same epoch. Converging means the train loss value or the test loss value reaches its global minima at a particular epoch. Responsive to determining that convergence occurred at a particular epoch, the system 100 selects the AI model trained at the particular epoch.

In an ideal case, the train loss value and the test loss value should be aligned with each other, and the more training epochs the AI model 132 goes through, the lower the training/test loss value should be achieved. However, due to various reasons, this may not be the case in reality. For example, in many cases, the training dataset 180 may include mislabeled samples. Alternatively, or in addition, the training dataset 180 may be limited to a small number of samples, etc. This is often true in foreign object detection or defect detection in many industries because defects are very rare, and captured images with positive defectives are even rarer. With limited labeled samples, the AI model may overfit to the training subset, resulting in convergence of the train loss value and test loss value early on during training.

Figure 3:
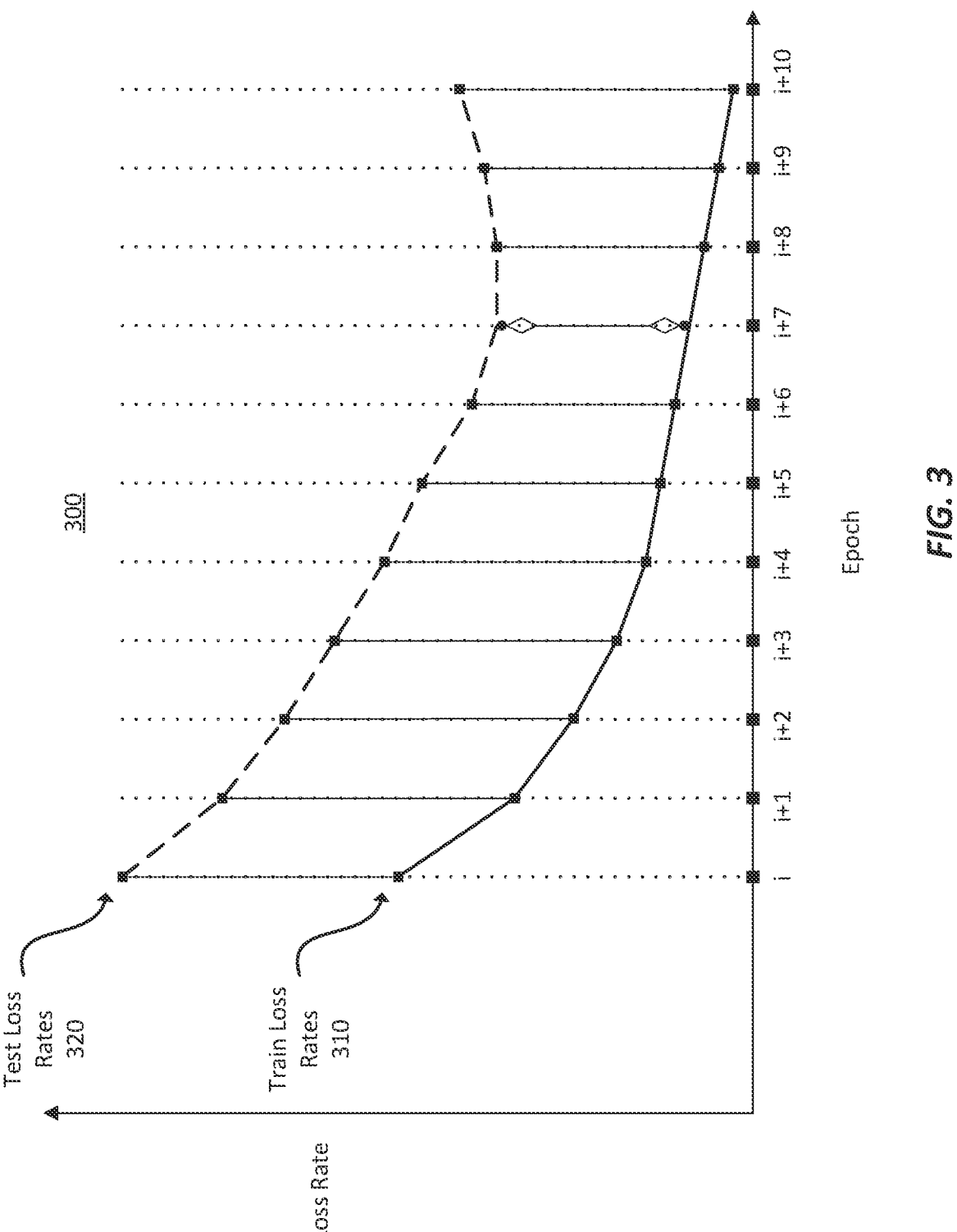
FIG. 3 illustrates a chart of example train loss values and test loss value s at a plurality of training epochs in accordance with some embodiments.

FIG. 3 illustrates a chart 300 of example train loss values and test loss value s at a plurality of training epochs. The horizontal axis represents numbers of training epochs, and the vertical axis represents loss value s. A plurality of train loss values 310 at training epochs i through i+10 are linked by a solid line, where i is a natural number. A plurality of test loss value s 320 at training epochs i through i+10 are linked by a dotted line. As illustrated, from training epoch i through training epoch i+7, the test loss value s and the train loss values continue to become closer to each other. At training epoch i+7, the test loss values converge, i.e., reaches its global minima. If the train loss values also converge at training epoch i+7, the AI model trained at training epoch i+7 will be selected for use.

However, as illustrated in FIG. 3, the train loss values did not converge at epoch i+7. When such a case occurs, the training system 100 identifies an epoch corresponding to the lowest test loss rate, which is epoch i+7 here. The system 100 then determines a difference between the train loss value and the test loss value at epoch i+7, and determines whether the difference is within a margin. In response to determining that the difference is within a margin, the training system selects the AI model trained at training epoch i+7. As illustrated, starting from training epoch i+8, the test loss values and the train loss values start to diverge, indicating that further training would not likely result in a better AI model, and the AI model 132 trained at training epoch i+7 is likely the best model with the training dataset 180. Thus, it is reasonable that the system 100 selects and outputs the AI model trained at training epoch i+7, and the system 100 avoids over training an AI model, saving computational resources while building in an AI model 190 with a better performance.

If the difference between the train loss value 310 and the test loss value 320 at epoch i+7 is greater than a margin, the system 100 may continue to train and checkpoint the AI model 132 until the two loss values converge at a same epoch or the train loss value at an epoch corresponding to the lowest test loss value is within a margin of the test loss value. In some embodiments, the system 100 determines whether both the test loss value and the train loss value at the epoch corresponding to the lowest test loss value are below a threshold (e.g., 0.1). Responsive to determining that both the lowest test loss value and the corresponding train loss value are within the threshold, the system outputs the AI model trained at the epoch. Alternatively, the system 100 determines a difference between the lowest test loss value and the corresponding train loss value is below a threshold. Responsive to determining that the difference is within a threshold, the system outputs the AI model trained at the epoch.

In some embodiments, the system 100 initially trains the AI model 132 for a predetermined number of training epochs (or a predetermined number of minutes) without performing checkpointing. For example, the system 100 may train the AI model 132 for 10 or 15 training epochs (or 3 to 5 minutes) without checkpointing. After that, the system 100 starts checkpointing on every training epoch or every predetermined number of training epochs (e.g., every two training epochs, every three training epochs, etc.). Because checkpointing consumes more computational resources and time, performing training for a predetermined number of training epochs without checkpointing saves computational resources.

In some cases, the train loss values 310 or the test loss values 320 may never converge or converge very early with a high loss value. If that is the case, the system 100 may generate an alert to the user, indicating the limits of the training data. This may be due to the low number of samples, or mislabeled samples. In some embodiments, the system 100 may redivide the training dataset into a new training subset and a new holdout test subset to train a new AI model. In some embodiments, the system 100 may also change the ratio between the training subset and the holdout test subset.

As briefly discussed above, referring back to FIG. 1, the system 100 includes a training dataset analysis module 110 configured to analyze the training dataset 180 to determine characteristics of the training dataset 180. The system 100 also includes a model selection module 120 configured to select an AI algorithm and a set of hyperparameters for training the AI model 190 based in part on the characteristics of the training dataset 180.

Figure 4:
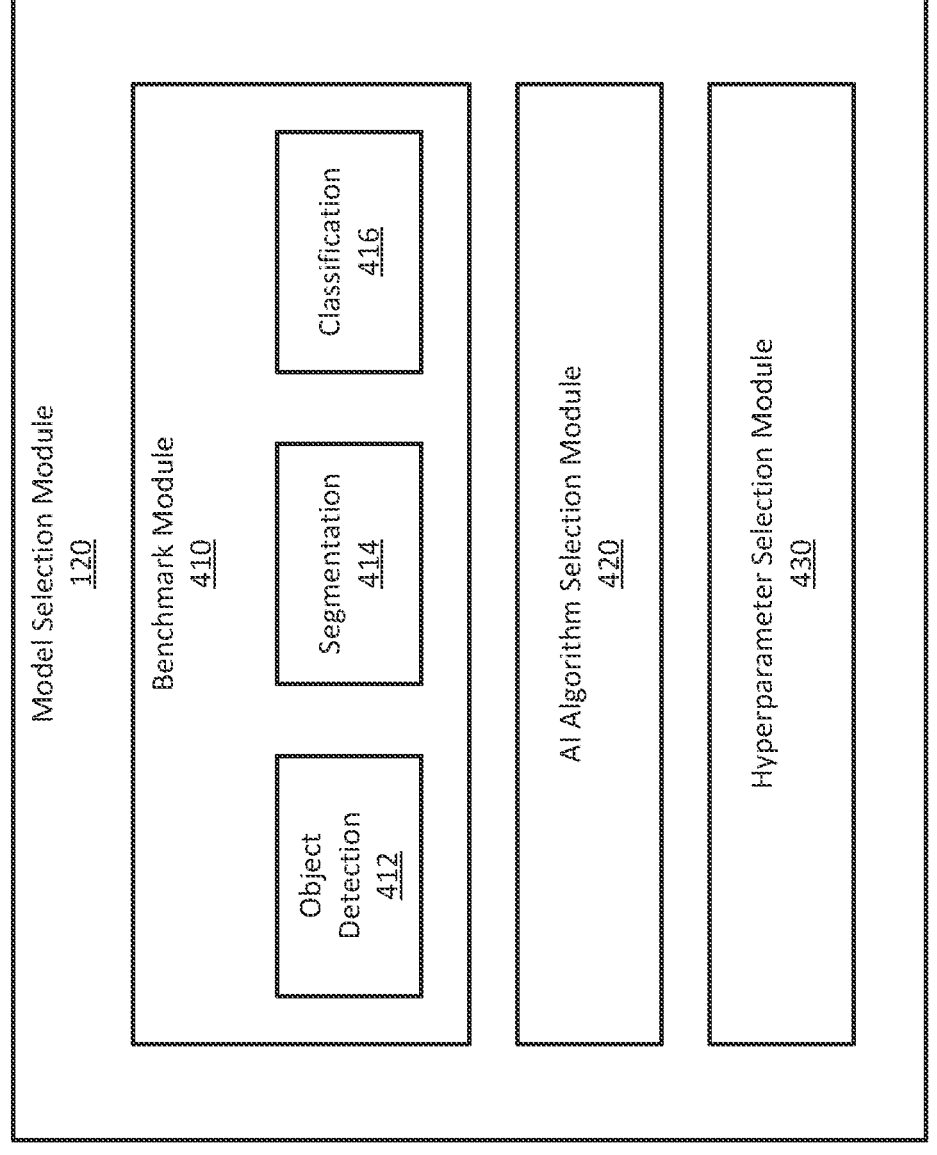
FIG. 4 illustrates an example embodiment of the model selection module in accordance with some embodiments.

FIG. 4 illustrates an example embodiment of the model selection module 120 in accordance with some embodiments. The model selection module 120 includes a benchmark module 410, an AI algorithm selection module 420, and a hyperparameter selection module 430. Alternative embodiments may include more, fewer, or different components from those illustrated in FIG. 4, and the functionality of each component may be divided between the components differently from the description below. Additionally, each component may perform their respective functionalities in response to a request from a human, or automatically without human intervention.

The benchmark module 410 is configured to benchmark a plurality of AI models against a plurality of training datasets. The plurality of AI models include (but are not limited to) one or more object detection models 412, one or more segmentation models 414, and/or one or more classification models 416. In some embodiments, the plurality of AI models may include a plurality of state-of-the-art (SOTA) models. The SOTA models may include (but are not limited to) Vision Transformers (ViT) (which are based on transformer architecture for image classification tasks), Efficient-Net (which is a family of convolutional neural networks that achieve SOTA accuracy while being computationally efficient), ResNet (Residual Neural Network) (which is a very deep learning neural network), DenseNet (Densely Connected Convolutional Networks) (which introduces direct connections between layers, allowing information to flow more efficiently throughout the network), Faster R-CNN (Faster Region-Based Convolutional Neural Network) (which is a model for object detection tasks), YOLO (You Only Look Once) (which is a real-time object detection model that can detect multiple objects in an image in a single pass), Mask R-CNN (which extends Faster R-CNN to include instance segmentation, providing both object detection and pixel-level segmentation in a single model), etc. Note, the field of computer vision is continually advancing, the benchmark module 410 may add new AI modules and training datasets to improve the performance of the training system 100.

The plurality of training datasets include training datasets across multiple domains, such as (but not limited to) industrial domain, agricultural domain, food domain, transportation domain, medical domain, marine domain, etc. In some embodiments, the module selection module 120 is configured to compare the characteristics of the training dataset (also referred to as a target training dataset) with characteristics of the plurality of training datasets (also referred to as benchmark training datasets) to determine similarity, and select an AI model from the set based on the similarity and the benchmarking.

In some embodiments, each of the plurality of benchmark training datasets or target training dataset includes a plurality of images labeled with ground truth labels. The images often have a same or similar size (e.g., 64×64, 256×256) and/or channel of color (e.g., grayscale, or red (R)-green (G)-blue (B) color). The characteristics include (but are not limited to) a domain among a plurality of domains to which images in a training dataset belong, a size of images in the training dataset, a channel of color of images in the training dataset, an annotation size to image size ratio, a total number of labeled samples, and/or a degree of human-level performance in the labeled samples.

A target training dataset may be compared with each of the plurality of benchmark training datasets to determine similarity. The similarity may be described as a similarity score. The training dataset corresponding to a highest similarity score (indicating most similar to the target training dataset) may be selected, and one or more AI models trained using the selected training dataset may then be selected as candidate AI models.

In some embodiments, to determine a similarity score between the target training dataset and any given training dataset in the benchmark module 410, a characteristic of the target training dataset is compared to a corresponding characteristic of that training dataset to determine a similarity score. For each of the plurality of characteristics, a plurality of similarity scores may be determined. The plurality of similarity scores may then be summarized into an overall similarity score. In some embodiments, the plurality of similarity scores may be assigned different weights, and a weighted average may be determined as the overall similarity score. The overall similarity scores for the plurality of benchmark training datasets may then be sorted to identify the benchmark training dataset that has the highest similarity score.

In some embodiments, benchmarking the set of AI models includes logging a plurality of metrics of the set of AI models trained using the plurality of training datasets. The plurality of metrics may include (but are not limited to) a training time, a training subset performance, a holdout test subset performance, an evaluation time, and/or training stability. In some embodiments, the training stability includes whether training produces an undefined result, or whether training produces an out-of-memory error.

In some embodiments, the model selection module 120 is configured to select an AI model from the set of benchmarked AI models based on the similarity between the target training dataset and benchmark training datasets and the metrics of the benchmarked AI models. In some embodiments, the model selection module 120 selects a benchmark training dataset that is the most similar to the target training dataset, and selects an AI model that is trained using the selected benchmark training dataset based on the logged metrics associated with the AI model. For example, the model selection module 120 selects an AI model trained using the selected benchmark training dataset and corresponding to a lowest training time, or a highest holdout test subset performance, etc. Alternatively, the model selection module 120 selects an AI model trained using the selected training dataset and balancing multiple metrics, e.g., the training time is lower than a first threshold, a holdout test subset performance is great than a second threshold, etc.

In some embodiments, the model selection module 120 further includes an AI algorithm selection module 420 and a hyperparameter selection module 430. In some embodiments, the AI algorithm selection module 420 is configured to select a backbone network of the AI model based on the characteristics of the target training dataset. A backbone network is an underlying network that supports the training process in a neural network. It enables the neural network to extract meaningful features from input data, such as visual features like edges, shapes, and textures from images. A backbone network may include a series of layers, each of which is responsible for transforming the input data into a representation that can be used by a next layer. In some embodiments, a backbone network is a portion of the AI model that connects other parts of the AI model together. In some embodiments, a backbone network is one of the plurality of AI models that is selected by the benchmark module 410.

In some embodiments, the AI algorithm selection module 420 is also configured to freeze at least a portion of the backbone network. For example, the AI algorithm selection module 420 may select to freeze a layer of the backbone network to accelerate training.

In some embodiments, the AI algorithm selection module 420 is also configured to select an output layer of the AI model. An output layer is a final layer in the AI model where a desired prediction is obtained. In a neural network, the output layer takes inputs from a previous layer, performs computations using its neurons, and then computes its output The output layer has its own set of weights and biases that are trained and applied. The output layer may have single or multiple nodes. For example, in a binary classification task, the output layer may have one output node, which outputs a result as 1 or 0.

In some embodiments, the AI algorithm selection module 420 is configured to select mixed precision training. Mixed precision training is a technique for training large neural networks using lower-precision operations. This technique uses a combination of multiple numerical precisions. For example, instead of using double precision float (which uses 32-bits to represent a number), mixed precision training may use half-precision floating point number format (which uses 16-bits to represent a number) to perform operations to make the model run faster and use less memory.

In some embodiments, the AI algorithm selection module 420 may be configured to fuse linear algebra calculations using accelerated linear algebra (XLA). XLA is a compiler-based linear algebra execution engine, which is a backend that powers AI frameworks such as TensorFlow and JAX on a variety of devices including CPU, GPUs, and TPUs. XLA may optimize array operations and compile the optimized operations into high-performant programs specific to target computing platforms.

In some embodiments, the AI algorithm selection module 420 may be configured to downsize or upsize image size in a target training dataset. For example, when a selected benchmark training dataset in the benchmark module 410 includes sample images of a first size, a target training dataset includes sample images of a second size, the system 100 may downsize or upsize image size in the target training dataset to match the selected benchmark training dataset.

In some embodiments, the AI algorithm selection module 420 may be configured to modify a neural network architecture. The neural network architecture may correspond to a selected AI model in the benchmark module 410.

In some embodiments, the AI algorithm selection module 420 may be configured to select using parallel workers for data loading. Data parallelism is a technique used to speed up training on large mini-batches when each mini-batch is too large to fit on a GPU. Under data parallelism, a mini-batch is split up into smaller-sized batches that are small enough to fit on the memory available on different GPUs on a network.

The hyperparameter selection module 430 is configured to select a set of hyperparameters for the AI model based on the characteristics of a target training dataset and a task at hand. The set of hyperparameters may include (but are not limited to) a batch size, a number of training epochs, and/or learning rate. A batch size refers to a number of training examples used in one iteration before an AI model is updated. A batch size must be equal to or greater than one and less than or equal to a total number of samples in the training dataset. For example, if there are 1000 training samples, a batch size is set as 100, the training process will take a first 100 samples from the training samples and train the AI model. The batch size can affect both a training time and generalization of the AI model. Generally, a smaller batch size allows the AI model to learn from each individual sample, but takes longer to train. A larger batch size trains faster but may result in the model not capturing the nuances in some training samples.

A learning rate controls how quickly an AI model updates or learns values of a parameter estimate. The learning rate regulates the weights of a neural network with respect to a loss gradient. The learning rate determines how fast or slow the network will move towards optimal weights. In some embodiments, a range of values to consider for the learning rate is often between 1.0 and 0.000006. Setting the learning rate too high would make a path unstable, and too low would make convergence slow.

In some embodiments, the hyperparameter selection module 430 is also configured to reduce a number of training epochs or stop training early during training. In some embodiments, the hyperparameter selection module 430 is also configured to skip or delay checkpointing during training.

Figure 5A:
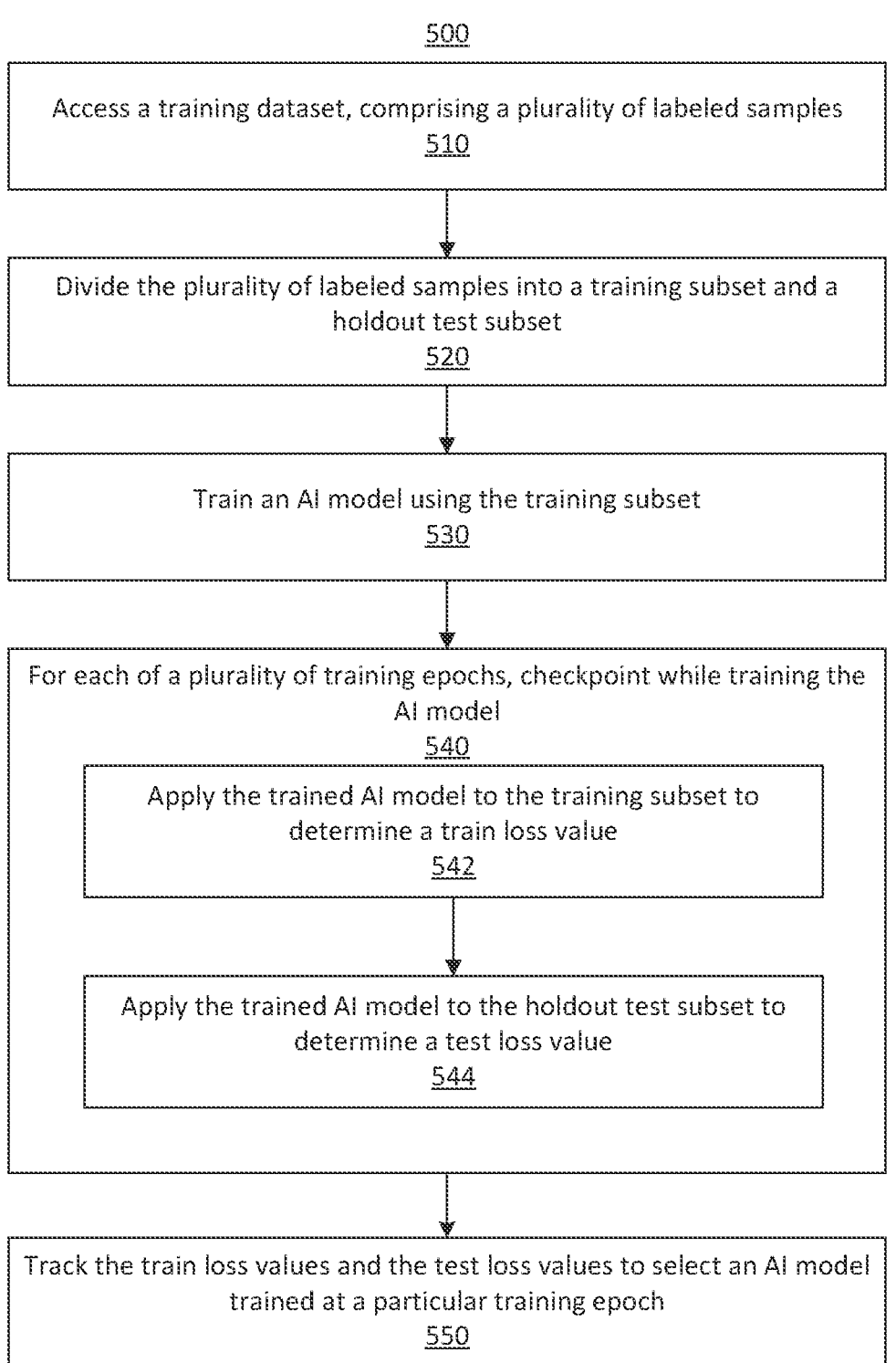
FIG. 5A is a flowchart for a method of fast training an AI model in accordance with some embodiments.
Figure 5B:
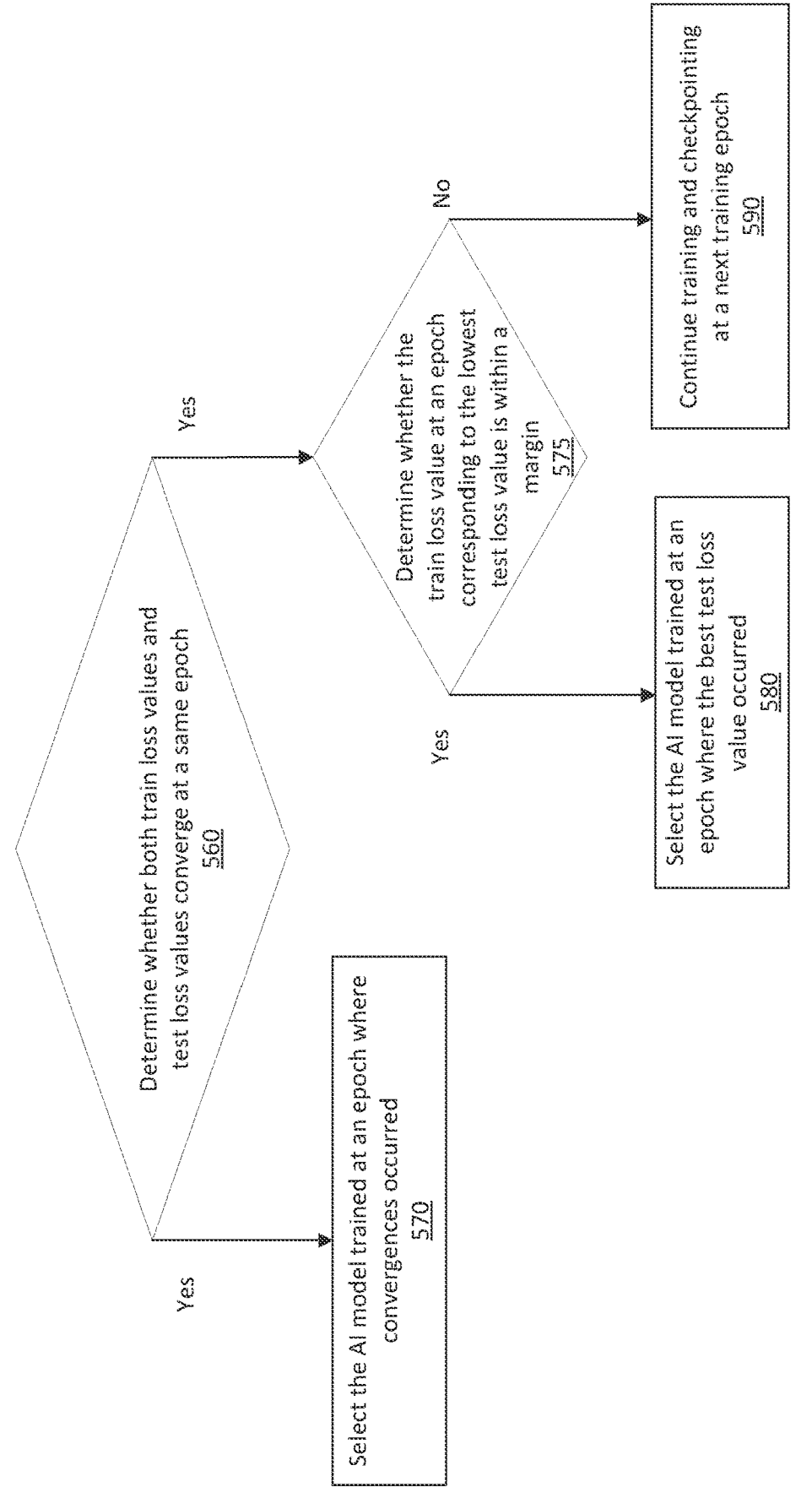
FIG. 5B is a flowchart for a method of tracking train loss values and test loss values of an AI model to select an AI model trained at a particular training epoch in accordance with some embodiments.

FIGS. 5A-5B is a flowchart for a method 500 of fast training an AI model in accordance with some embodiments. Alternative embodiments may include more, fewer, or different steps from those illustrated in FIGS. 5A-5B, and the steps may be performed in a different order from that illustrated in FIG. 5A-5B. These steps may be performed by a training system (e.g., fast training system 100).

Referring to FIG. 5A, the training system accesses 510 a training dataset. The training dataset includes a plurality of labeled samples, each of which is labeled with a ground-truth label. For example, in an object detection task, each labeled sample includes an image labeled with a binary label, indicating an object or not the object. The label may also correspond to an annotated area in the image where the object is found.

The training system divides 520 the plurality of labeled samples into a training subset and a holdout test subset. In some embodiments, the division of the plurality of labeled samples is based on a ratio between the training subset and a holdout test subset. The ratio may be selected by the training system, or be set by a user. For example, the ratio may be 3:1 or 70%: 30%.

The training system trains 530 an AI model using the training subset. For each of a plurality of training epochs, the training system checkpoints 540 while training the AI model. Checkpointing comprises applying 542 the trained AI model to the training subset to determine a train loss value, applying 544 the trained AI model to the holdout test subset to determine a test loss value. The training system tracks 550 the train loss values and the test loss values to select an AI model trained at a particular training epoch.

FIG. 5B is a flowchart of a method 550 for tracking train loss values and test loss value s to select an AI model trained at a particular training epoch, which corresponds to the step 550 of FIG. 5A.

Note, when the quality of training data or the volume of the training data is limited, the train loss value and the test loss value may first converge during the first several training epochs, and then start to diverge after that. The diverging point is where the model starts to overfit the training subset, but no longer fits the holdout test set. When this occurs, additional training generally will no longer improve the model.

Referring to FIG. 5B, the training system determines 560 whether both train loss values and test loss values converge at a same epoch. Responsive to determining that both train loss values and test loss values converge at a same epoch (Yes), the training system selects 570 the AI model trained at the epoch where convergences occurred. In some embodiments, the system may relax convergence requirement to allow the convergence of test loss values and the convergence of the train loss values to be within a predetermined number of epochs. The training system may select an AI model trained at any one of the epochs between the convergence of the test values and the convergence of the train loss values.

In many cases, the selected model is the best model trained based on the training subset because additional training will result in an overfitting model. However, when the quality of the training data and the volume of the training data are both fairly high, the train loss value and the test loss value will not converge until many training epochs later. When this happens, the training system may continue to train AI model to further reduce its loss value. Alternatively, the training system may stop training at a point where the training and/or test loss values are below a threshold or within a margin.

Referring to FIG. 5B, after the plurality of training epochs, responsive to determining that both train loss values and test loss values have not converged at any epoch or have not converged at a same epoch (No), the training system determines 575 whether the train loss value at an epoch corresponding to the lowest test loss value is within a margin (Yes). In some embodiments, the training loss rate and the test loss rate are compared with an absolute margin. In some embodiments, the training loss rate is compared with the test loss rate to determine whether the difference between the training loss rate and the test loss rate is within a margin. Responsive to determining that the training loss rate at the epoch is within the margin, the training system selects 580 the AI model trained at that epoch. Responsive to determining that training loss rate at the epoch is not within a margin (No), the training system continues 590 training the AI model and checkpointing at a next training epoch.

In some embodiments, after a few additional training epochs, the training system continues to track 550 the train loss values and the test loss values. This includes determining 560 whether convergence between the train loss value and the test loss value has occurred at one of the additional training epochs. In some embodiments, this process repeats as long as necessary until convergence between the train loss value and the test loss value occurs at a same epoch, and/or a training loss rate at an epoch corresponding to a lowest test loss rate is within a margin.

In some embodiments, the checkpointing 540 does not occur after a predetermined number of training epochs or training time. For example, in some embodiments, the system 100 trains for 10 training epochs or 5 minutes without checkpointing. After that, the system 100 starts checkpointing at each training epoch or every predetermined number of training epochs, e.g., 2 or 3. Alternatively, the system 100 checkpoints at a lower frequency during the first a few training epochs (e.g., checkpointing every two or three training epochs during the first 15 training epochs), and checkpoints at a higher frequency during a next few training epochs (e.g., every training epoch during the second 15 training epochs).

Figure 6:
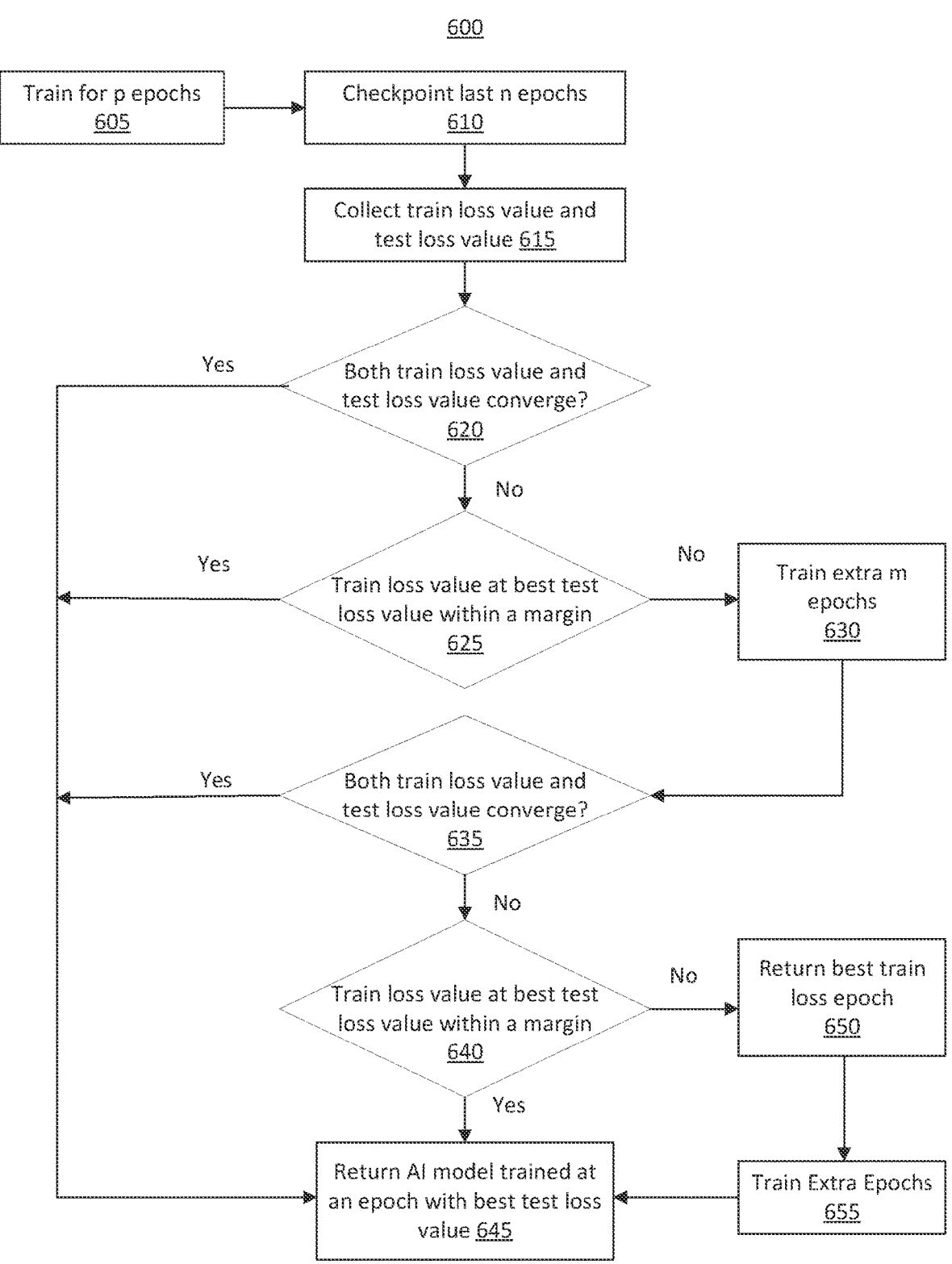
FIG. 6 is a flowchart for a method of fast training an AI model in accordance with another embodiment.

FIG. 6 illustrates another flowchart of a method 600 of training an AI model in accordance with some embodiments. Alternative embodiments may include more, fewer, or different steps from those illustrated in FIG. 6, and the steps may be performed in a different order from those illustrated in FIG. 6. These steps may be performed by a training system (e.g., fast training system 100).

The training system trains 605 the AI model for p epochs, where p is a natural number. Among the p epochs, the training system checkpoints 610 last n epochs, where n is a natural number, and $n \leq p$. For each of the n epochs, the system collects 615 train loss values and test loss values. The system determines 620 whether both train loss values and test loss values converge at a same epoch. Converging of train loss values or test loss values occurs when the train loss values or test loss values are at their global minima. In response to determining that both train loss value and test loss value converge at the same epoch (Yes), the system returns 645 an AI model trained at an epoch with the best test loss value. In this case, the epoch would be the converging epoch, at which both the train loss value and test loss value are the best, i.e., lowest.

In some embodiments, the system may relax convergence requirement to allow the convergence of test loss values and the convergence of the train loss values to be within a predetermined number of epochs. The training system may return an AI model trained at any one of the epochs between the convergence of the test values and the convergence of the train loss values. Alternatively, the training system may return 645 an AI model trained at an epoch with the best test loss value, i.e., the epoch where convergence of test loss value occurred.

On the other hand, in response to determining that both train loss value and test loss value do not converge at a same epoch (No), the system determines 625 whether a train loss value at an epoch that corresponds to a best test loss value is within a margin. In some embodiments, the margin is a threshold for the train loss value. For example, as long as the train loss value is lower than a threshold value, this condition is deemed satisfactory. Alternatively, the margin is a threshold for a difference between the train loss value and the test loss value. For example, when a difference between the train loss value and the test loss value is within a threshold, the condition is deemed satisfactory. When the train loss value at an epoch corresponding to a best test loss value is within the margin (Yes), the system returns 645 an AI model trained at an epoch with the best test loss value.

When the train loss value at an epoch corresponding to a best test loss value is not within a margin, the system trains 630 the AI model for an extra m epochs, where m is a natural number. In some embodiments, the system checkpoints all the m epochs. In some embodiments, the system only checkpoints the last a few epochs among the m epochs. Train loss value and test loss values are collected during the checkpointed epochs. After the extra m epochs of training, the system determines 635 again whether both train loss value and test loss value converge at a same epoch. In response to determining that both train loss value and test loss value converge at the same epoch (Yes), the system returns an AI model trained at an epoch with the best test loss rate. Here, the epoch is one that both loss values converge. Again, in some embodiments, the system may relax convergence requirement to allow the convergence of test loss values and the convergence of the train loss values to be within a predetermined number of epochs.

Again, in response to determining that both train loss value and the test loss value do not converge at a same epoch (No), the system determines 640 train loss value at an epoch corresponding to a best test loss value is within a margin. In response to determining that the best test loss value is within a margin (Yes), the system returns 645 an AI model trained at an epoch with the best test loss value. On the other hand, in response to determining that the best train loss value is not within a margin (No), the system returns 650 an epoch corresponding to a best train loss value, and trains 655 the AI model for an extra number of epochs. This process may repeat as many times as necessary until one of the two conditions 635 and 640 is satisfied. Alternatively, this process may stop at a maximum epoch.

Note, the steps discussed in FIGS. 5A, 5B, and 6 can be used to select an AI model trained at a particular training epoch to avoid overtraining. However, in some cases, the quality of training data is poor, the train loss value and the test loss value may never converge, or start to diverge at an early training epoch. Alternatively, or in addition, the test loss value is never lower than an acceptable threshold. If one or more of these situations occur, the training system may determine that the quality of the training data is too poor, or the volume of the training samples is too low. When this happens, the training system may generate an alert, notifying a user of the limits of the training samples, and/or suggesting the user provide additional training samples.

Figure 7:
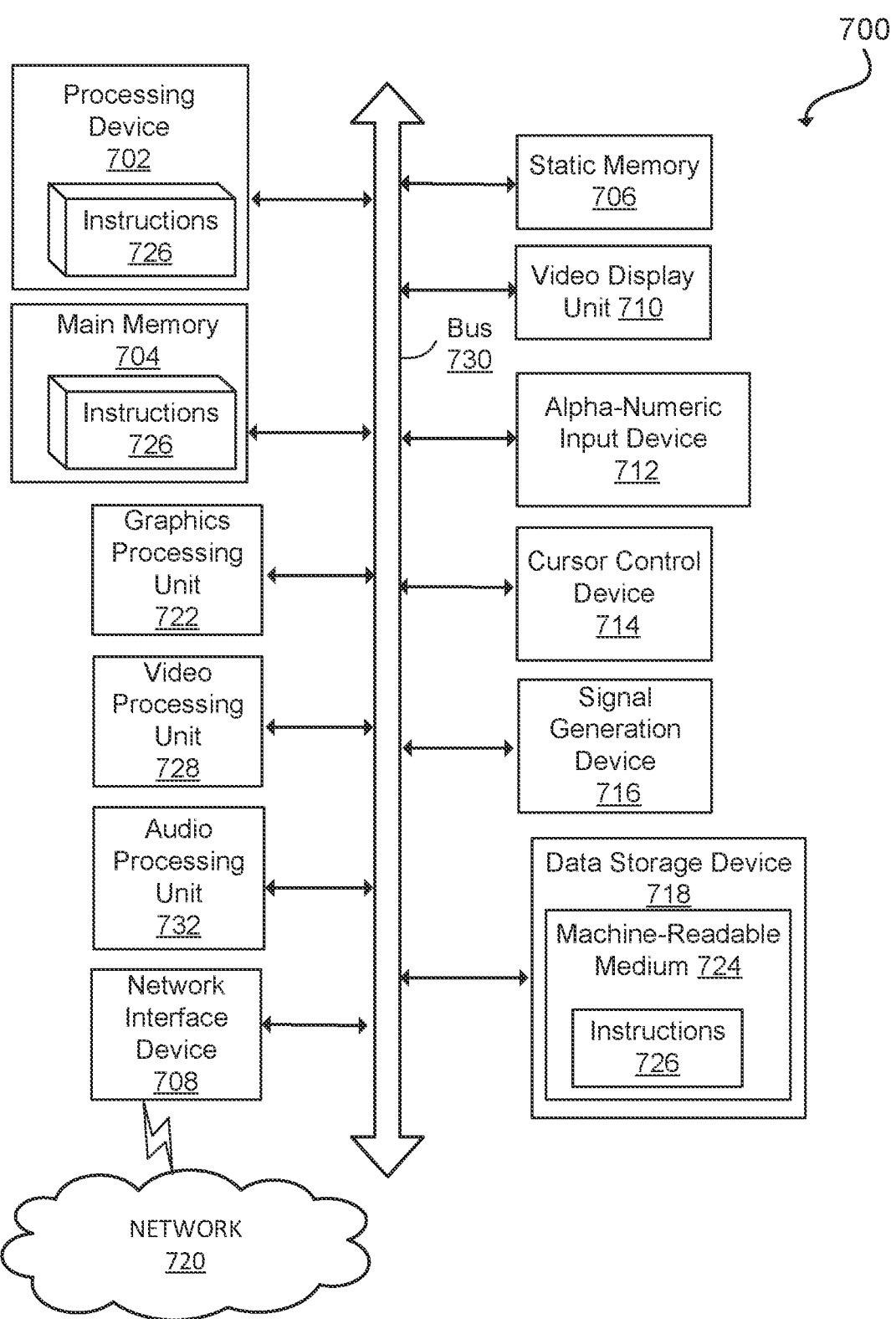
FIG. 7 is a diagram of an example computer system in which embodiments of the present disclosure may operate in accordance with some embodiments.

FIG. 7 illustrates an example machine of a computer system 700 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in a client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM), a static memory 706 (e.g., flash memory, static random access memory (SRAM), etc.), and a data storage device 718, which communicate with each other via a bus 730.

Processing device 702 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 may be configured to execute instructions 726 for performing the operations and steps described herein.

The computer system 700 may further include a network interface device 708 to communicate over the network 720. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), a graphics processing unit 722, a signal generation device 716 (e.g., a speaker), graphics processing unit 722, video processing unit 728, and audio processing unit 732.

The data storage device 718 may include a machine-readable storage medium 724 (also known as a non-transitory computer-readable medium) on which is stored one or more sets of instructions 726 or software embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting machine-readable storage media.

In some implementations, the instructions 726 include instructions to implement functionality corresponding to the present disclosure. While the machine-readable storage medium 724 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 702 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A computer-implemented method for fast training an artificial intelligence (AI) model, the method comprising:

accessing a training dataset comprising a plurality of labeled samples, each of the plurality of labeled samples labeled with a ground-truth label;

dividing the plurality of labeled samples into a training subset and a holdout test subset;

training the AI model using the training subset;

for each of a plurality of training epochs, checkpointing while training the AI model, wherein checkpointing comprises:

applying a partially trained AI model, which is partially trained from one or more prior training epochs, to the training subset to determine a train loss value; and applying the partially trained AI model to the holdout test subset to determine a test loss value;

determining whether both train loss values and test loss values converge at a particular epoch;

responsive to determining that convergence occurred at the particular epoch, selecting the AI model trained at the particular epoch;

responsive to determining that convergence of train loss values and convergence of test loss values did not occur at a same epoch, identifying an epoch corresponding to a lowest test loss value;

determining whether a difference between the train loss value and the test loss value at the epoch is below a margin;

responsive to determining that the difference between the train loss value and the test loss value is below the margin, selecting the AI model trained at the epoch for use; and responsive to determining that the difference between the train loss value and the test loss value is greater than the margin, continuing on to a next training epoch.

2. The computer-implemented method of claim 1, wherein continuing on to the next training epoch comprises skipping one or more predetermined training epochs for checkpointing.

3. The computer-implemented method of claim 1, further comprising:

before the plurality of training epochs of checkpointing, training the AI model for a predetermined number of training epochs without checkpointing.

4. The computer-implemented method of claim 1, wherein the plurality of labeled samples comprise a plurality of images annotated with labels, and wherein the method further comprises:

analyzing the plurality of images to determine characteristics of the plurality of images; and selecting an AI algorithm and a set of hyperparameters for training the AI model based in part on the characteristics of images.

5. The computer-implemented method of claim 4, wherein the characteristics of images comprise a characteristic indicative of a domain among a plurality of domains, the plurality of domains comprising an industrial domain, a medical domain, an agriculture domain, and a transportation domain.

6. The computer-implemented method of claim 4, wherein the set of hyperparameters comprises one or more of a batch size, a learning rate, and a training epoch number for initial training.

7. The computer-implemented method of claim 4, further comprising:

benchmarking a set of AI models against a plurality of benchmark training datasets, wherein benchmarking the set of AI models against the plurality of benchmark training datasets comprises logging a plurality of metrics of the set of AI models trained using the plurality of benchmark training datasets;

comparing the characteristics of the training dataset with characteristics of the plurality of benchmark training datasets to determine similarity; and selecting an AI model from the set based in part on the similarity and the plurality of metrics of the set of AI models.

8. The computer-implemented method of claim 7, wherein selecting the AI model in the set comprises:

selecting a backbone network of the AI model.

9. The computer-implemented method of claim 8, wherein selecting the AI model in the set comprises freezing a portion of the selected backbone network.

10. A computer system comprising:

one or more processors; and a non-transitory computer-readable storage medium having instructions encoded thereon that, when executed by a processor, cause the one or more processors to:

access a training dataset comprising a plurality of labeled samples, each of the plurality of labeled samples labeled with a ground-truth label;

divide the plurality of labeled samples into a training subset and a holdout test subset;

train an AI model using the training subset;

for each of a plurality of training epochs, checkpoint while training the AI model, wherein checkpointing comprises:

apply a partially trained AI model, which is partially trained from one or more prior training epochs, to the training subset to determine a train loss value; and apply the partially trained AI model to the holdout test subset to determine a test loss value;

determine whether both train loss values and test loss values converge at a particular epoch;

responsive to determining that convergence occurred at the particular epoch, select the AI model trained at the particular epoch;

responsive to determining that convergence of train loss values and convergence of test loss values did not occur at a same epoch, identifying an epoch corresponding to a lowest test loss value;

determining whether a difference between the train loss value and the test loss value at the epoch is below a margin;

responsive to determining that the difference between the train loss value and the test loss value is below the margin, selecting the AI model trained at the epoch for use; and responsive to determining that the difference between the train loss value and the test loss value is greater than the margin, continuing on to a next training epoch.

11. The computer system of claim 10, wherein continuing on to the next training epoch comprises skipping one or more predetermined training epochs for checkpointing.

12. The computer system of claim 10, the non-transitory computer-readable storage medium having additional instructions encoded thereon that, when executed by a processor, cause the one or more processors to:

before the plurality of training epochs of checkpointing, train the AI model for a predetermined number of training epochs without checkpointing.

13. The computer system of claim 10, wherein the plurality of labeled samples comprise a plurality of images annotated with labels, and wherein the non-transitory computer-readable storage medium having additional instructions encoded thereon that, when executed by a processor, cause the one or more processors to:

analyze the plurality of images to determine characteristics of the plurality of images; and select an AI algorithm and a set of hyperparameters for training the AI model based in part on the characteristics of images.

14. The computer system of claim 13, wherein the characteristics of images comprise a characteristic indicative of a domain among a plurality of domains to which the plurality of images belong, the plurality of domains comprising an industrial domain, a medical domain, an agriculture domain, and a transportation domain.

15. The computer system of claim 14, the non-transitory computer-readable storage medium having additional instructions encoded thereon that, when executed by a processor, cause the one or more processors to:

benchmark a set of AI models against a plurality of benchmark training datasets, wherein benchmarking the set of AI models against the plurality of benchmark training datasets comprises logging a plurality of metrics of the set of AI models trained using the plurality of benchmark training datasets;

compare the characteristics of the training dataset with characteristics of the plurality of benchmark training datasets to determine similarity; and select an AI model from the set based in part on the similarity and the plurality of metrics of the set of AI models.

16. The computer system of claim 15, wherein selecting the AI model in the set comprises:

selecting a backbone network of the AI model.

17. The computer system of claim 15, wherein the set of hyperparameters comprises one or more of a batch size, a learning rate, and a training epoch number for initial training.

18. A non-transitory computer-readable storage medium having instructions encoded thereon that, when executed by a processor, cause one or more processors to:

access a training dataset comprising a plurality of labeled samples, each of the plurality of labeled samples labeled with a ground-truth label;

divide the plurality of labeled samples into a training subset and a holdout test subset;

train an AI model using the training subset;

for each of a plurality of training epochs, checkpoint while training the AI model, wherein checkpointing comprises:

apply a partially trained AI model, which is partially trained from one or more prior training epochs, to the training subset to determine a train loss value; and apply the partially trained AI model to the holdout test subset to determine a test loss value;

determine whether both train loss values and test loss values converge at a particular epoch;

responsive to determining that convergence occurred at the particular epoch, select the AI model trained at the particular epoch;

responsive to determining that convergence of train loss values and convergence of test loss values did not occur at a same epoch, identifying an epoch corresponding to a lowest test loss value;

determining whether a difference between the train loss value and the test loss value at the epoch is below a margin;

responsive to determining that the difference between the train loss value and the test loss value is below the margin, selecting the AI model trained at the epoch for use; and responsive to determining that the difference between the train loss value and the test loss value is greater than the margin, continuing on to a next training epoch.

\* \* \* \* \*